C. S. McARDLE.
PEANUT CLIPPER.
APPLICATION FILED JUNE 29, 1918.
1,285,276.
Patented Nov. 19, 1918.
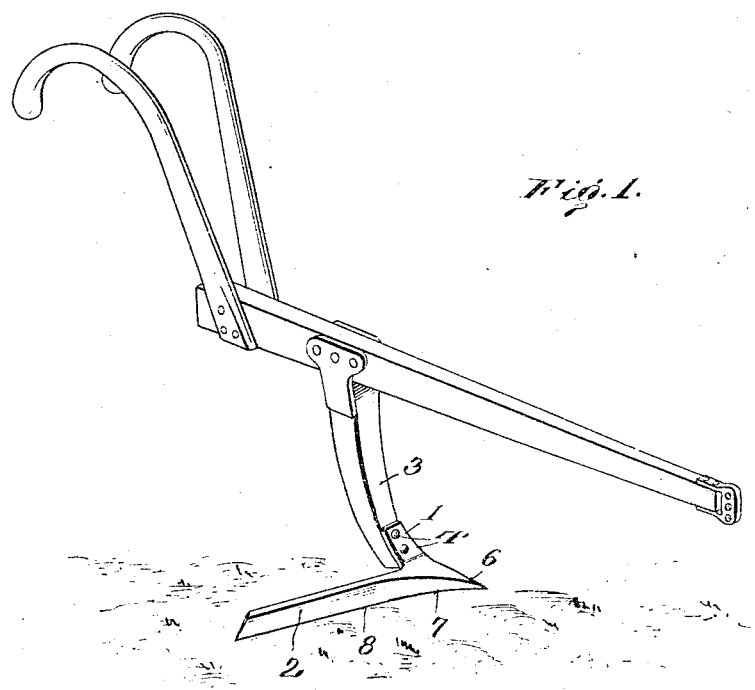
Fig. 1.
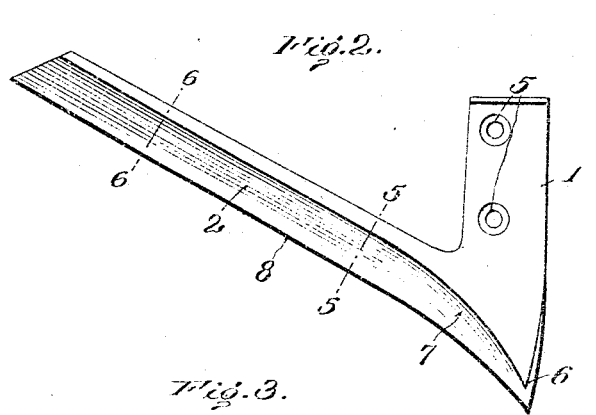
Fig. 2.
Fig. 4.
Fig. 3.
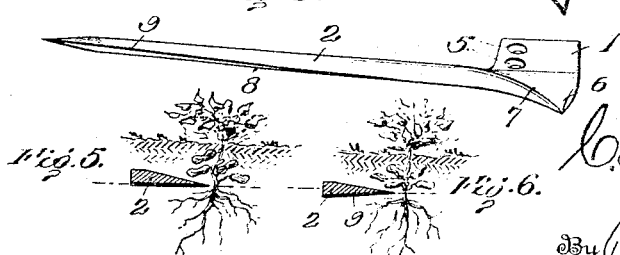
Fig. 5.   Fig. 6.
Inventor
C. S. McArdle,
By Wm E. Dyne
Attorney

UNITED STATES PATENT OFFICE.

CORNELIUS S. McARDLE, OF DOTHAN, ALABAMA.

PEANUT-CLIPPER.

1,285,276.  Specification of Letters Patent.  Patented Nov. 19, 1918.

Application filed June 29, 1918.  Serial No. 242,572.

*To all whom it may concern:*

Be it known that I, CORNELIUS S. MCARDLE, a citizen of the United States, residing at Dothan, in the county of Houston and State of Alabama, have invented certain new and useful Improvements in Peanut-Clippers; and I do hereby declare the following to be a full, clear, and exact description of the invention, such as will enable others skilled in the art to which it appertains to make and use the same.

This invention relates to peanut clippers and contemplates more especially an improved device for cutting the peanuts from the vines in the soil, whereby their extraction therefrom is rendered relatively easy.

The invention has for an object the production of a plow-like clipper adapted to enter the soil, pass beneath and sever the roots bearing the product from the lower roots or nodules which latter are preferably left in the ground for fertilizing purposes.

Another object of the invention is to produce a plow-like clipper comprising an attaching shank and relatively narrow cutting blade arranged at an angle to the shank, the said blade being adapted to be drawn through the ground in a substantially horizontal plane for frictionally side shearing the roots.

A further object of this invention resides in the production of a peanut clipping plow formed with an attaching shank having a relatively bent point for entering the ground, and a rearwardly diverging cutting blade gradually curved away from said point and slightly twisted at its outer end, whereby movement through the ground tends to sharpen and keep the blade in cutting condition.

With these and other objects in view the invention further consists in the formation and arrangement of the clipper hereinafter particularly described and pointed out in the appended claims.

In the drawings, in which similar reference characters designate corresponding parts, Figure 1 is a perspective view of my improved clipping device shown attached to the standard of a plow.

Fig. 2 is a top plan view of the clipping plow detached from the plow standard.

Fig. 3 is a front elevation thereof.

Fig. 4 is an end view.

Fig. 5 is a detail sectional view through the cutting blade on the line 5—5 of Fig. 2, illustrating the beveled cutting edge and diagrammatically its operation upon the roots of the plant in the soil, and Fig. 6 is a similar view on the line 6—6 of Fig. 2 near the outer end of the cutting blade showing the slight twist imparted to the blade and its relative position in the ground when operating upon the roots of the plant.

The present invention has been primarily designed to facilitate the harvesting of peanuts. Peanuts grow almost four inches beneath the surface of the ground on vine-like roots. These roots in addition to bearing the fruit or product extend downwardly into the ground for a considerable depth. The clipping plow operates between the product and the lower roots, cutting the vines, and loosening the soil so that the peanuts can be readily removed from the earth.

The precision with which my improved clipper must operate at this approximately mean depth is obvious, and to that end it comprises a shank 1 from which diverges a relatively thin and narrow cutting blade 2 of wedge shape on cross-section. The shank of the clipper is suitably secured to the standard 3 of an ordinary plow by means of bolts 4 arranged in counter-sunk openings 5 provided in the shank 1.

Formed on the lowermost portion of the shank is a curved point 6 which is designed to enter and loosen the ground, and direct the clipper against the roots of the plant. The wedge shaped cutting blade 2 is formed integrally with the shank 1 and slightly curves away from the point 6 as indicated at 7, terminating in a relatively long sweep having a straight knife or cutting edge 8. The degree of the angle of the cutting blade is computed so that as the clipper is moved through the ground the roots are gradually sheared upon one side thereof, as distinguished from being chopped.

The cutting or knife edge 8 of the blade 2 is formed by beveling the upper surface thereof as shown. This bevel begins at the point 6 and curves with the cutting blade, extending to the outer end thereof.

By this curved and beveled construction it will be seen that the roots are gradually selected and the cutting edge pressed against them.

The cutting blade 2 and more particularly the knife edge 8, is given a dip at the point 6 thereof, and a slight twist is also imparted to the outer end of the cutting blade (see Figs. 3 and 6). This twist is indicated at 9 and in addition to facilitating the shearing cut given the roots, also acts to guide the cutting blade in the ground whereby the passage of the earth thereon tends to keep the knife edge in sharpened or cutting condition.

In operation, the clipping plow is drawn through the ground, the point 6 first entering the soil and effectively loosening the earth. As the plow advances the roots are caught by the sharp point 6 and directed against the curved cutting portion 7 which surface begins the cutting or shearing action just prior to the advancing of the long narrow sweep or cutting edge 8 which latter completes the severing operation. The cutting blade moves through the soil in substantially a flat position. The clipping plow is attached at a suitable angle to the standard of a plow which may be drawn and guided in the usual manner.

From the foregoing it will be obvious that I have produced an efficient, light, durable and easily manipulated clipper and one capable of being cheaply manufactured.

I claim:

1. A clipping plow of the class described comprising an attaching shank and an integrally formed rearwardly diverging narrow cutting blade of wedge shape in cross section, said blade having a knife edge beginning in a curve from the point of the plow and terminating in a straight cutting edge for passing through the ground in a substantially horizontal plane.

2. A clipping plow of the class described comprising an attaching shank and a rearwardly diverging narrow cutting blade of wedge shape in cross section, said blade having a knife edge curved inwardly from the point of the plow and terminating in a straight cutting edge the outer end of which is slightly twisted.

In testimony whereof I affix my signature, in presence of the subscribing witnesses.

CORNELIUS S. × McARDLE.
his mark

Witnesses:
R. C. WILLIAMS,
L. A. FARMER,
W. J. MARTIN.

Copies of this patent may be obtained for five cents each, by addressing the "Commissioner of Patents, Washington, D. C."